C. L. FRENCH.
Means for Transmitting Rotary Motion.

No. 224,168. Patented Feb. 3, 1880.

Witnesses:
Thomas E. Birch.
Fred. K. Haynes

Inventor
Charles L. French
by his Attorneys
Brown & Brown

UNITED STATES PATENT OFFICE.

CHARLES L. FRENCH, OF BROOKLYN, NEW YORK.

MEANS FOR TRANSMITTING ROTARY MOTION.

SPECIFICATION forming part of Letters Patent No. 224,168, dated February 3, 1880.

Application filed December 10, 1879.

*To all whom it may concern:*

Be it known that I, CHARLES L. FRENCH, of the city of Brooklyn, in the county of Kings and State of New York, have invented certain new and useful Improvements in Means for Transmitting Rotary Motion, of which the following is a specification.

My improvements are applicable for use as clutches in transmitting rotary motion from a continuously rotary shaft or wheel, or for converting an alternate rotary or oscillating motion into direct rotary motion in all kinds of machinery.

My invention consists in the combination, with a hub or shaft and a drum arranged upon the same and provided with openings or recesses between its inner circumference and the hub or shaft, of rollers arranged in said openings or recesses and mounted upon axes projecting from the free ends of pivoted arms or levers, so that the rollers may swing radially to adjust themselves properly between the shaft or hub. The roller-supporting levers are preferably pivoted to a plate or disk, which may be oscillated to bring the said rollers at one side or the other of said openings or recesses to transmit motion in either direction, or in the middle of said openings or recesses, where they are inoperative.

Figure 1:
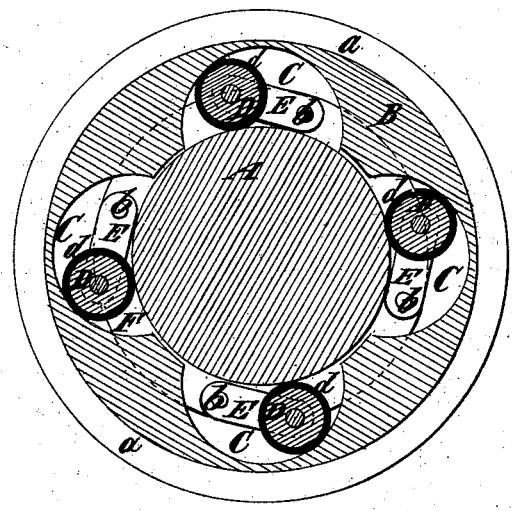
Figure 2:
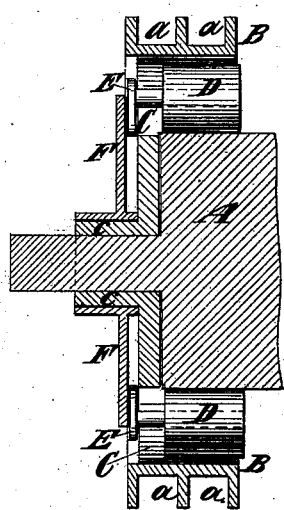
Figure 3:
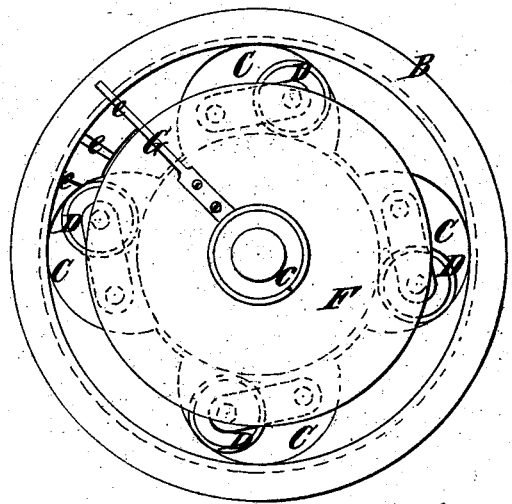

In the accompanying drawings, Figure 1 represents a section through a clutch embodying my improvements, upon a plane transverse to the axis thereof. Fig. 2 represents a longitudinal section in a plane parallel with the axis, and Fig. 3 represents a face view of the back of the clutch.

Similar letters of reference designate corresponding parts in all the figures.

A designates a rotary shaft or a hub mounted on a rotary shaft; and B designates an outer pulley or drum fitting loosely around the hub or shaft, and adapted to be rotated continuously in one direction, or alternately rotated or oscillated.

In the drawings, the hub or shaft A may be supposed to constitute the hub of any wheel to which direct rotary motion is to be imparted, while the drum B is provided with peripherical grooves $a$, around and in which may be arranged cords for imparting alternate rotary motion to or oscillating the drum.

In the inner circumference of the drum B, and between it and the hub or shaft A, are openings or recesses C, which are here represented as four in number, though more or less might be used. These recesses are here represented as segmental; but they might have inclined sides sloping inward from the center. The surfaces of these recesses may be smooth or roughened or corrugated. In these openings or recesses are arranged rollers D, which are here represented as cylindric, though spherical or other shaped rollers or balls might be employed. The said rollers may have their surfaces smooth or roughened or corrugated. The axes of these rollers are secured to the free ends of levers E, which are pivoted at their other ends, $b$, to a plate or disk, F, arranged at the side of the drum B upon a hub, $c$, extending therefrom, upon which it may be turned or oscillated. In order to increase the bite or hold of said rollers upon the hub or shaft, they are represented as being elastic rubber coverings $d$.

The rollers, as they are free to move inward or outward in approximately radial lines, press with equal force upon the inner sides of the openings or recesses and upon the periphery of the hub or shaft A, and not with greater force upon one than the other, as might be the case were the rollers arranged upon fixed axes. The plate or disk F may be oscillated to bring the rollers in contact with either side of the recesses or openings, so as to convert the oscillating movement of the drum into a rotary motion of the hub or shaft A and such devices as may be permanently secured thereto in either direction.

G designates an arm or lever fixed to the plate or disk F, and which engages with one of three notches or catches, $e$, in the drum B, so as to hold the rollers in either of their operative positions or centrally in the recesses, when they will be inoperative. This arm may be elastic, so that it may hold the rollers to their work with an elastic pressure.

What I claim as my invention, and desire to secure by Letters Patent, is—

1. The combination, with a hub or shaft and a drum arranged upon the same and provided with openings or recesses between its inner circumference and the hub or shaft, of rollers arranged in said openings or recesses, and levers pivoted at one end, and having axes or bearings for said rollers upon their free ends, so that said rollers may swing approximately radially to said hub or shaft, substantially as specified.

2. The combination, with the hub or shaft A and the drum B, having recesses or openings C, of the levers E, having rollers D mounted at one end and the other end pivoted to the oscillating plate or disk F, substantially as specified.

3. The combination, with the hub or shaft A and drum B, provided with recesses or openings C, of the levers E, having the rollers D mounted at one end and pivoted at the other end to the disk or plate F, and the arm or lever G, extending from said disk or plate and engaging with notches or catches in said drum, substantially as and for the purpose specified.

CHAS. L. FRENCH.

Witnesses:
AUSTIN D. MIDDLETON,
FREDK. HAYNES.